United States Patent [19]

Grubbs et al.

[11] Patent Number: 5,026,783

[45] Date of Patent: Jun. 25, 1991

[54] HIGH ENERGY POLYMERS FORMED BY RING OPENING METATHESIS POLYMERIZATION

[75] Inventors: Robert H. Grubbs; Dennis A. Dougherty, both of S. Pasadena, Calif.; Timothy M. Swager, Brookline, Mass.; Eric J. Ginsburg, Pasadena, Calif.

[73] Assignee: California Institute of Technology, Pasadena, Calif.

[21] Appl. No.: 261,092

[22] Filed: Oct. 24, 1988

[51] Int. Cl.$^5$ .............................. C08F 8/48; C08F 4/78; C08F 32/04; C08F 32/08
[52] U.S. Cl. ................... 525/326.1; 525/360; 525/371; 526/170; 526/172; 526/280; 526/281; 526/308
[58] Field of Search ............... 526/160, 161, 281, 285, 526/280, 170, 172, 308; 525/326.1, 360, 371

[56] References Cited

U.S. PATENT DOCUMENTS 4,603,185 7/1986 Benton et al. ............... 526/142 X
4,673,731 6/1987 Feast et al. ................... 526/281 X

OTHER PUBLICATIONS

Polymer Chemistry (2nd Ed.), Seymour et al., Marcel Dekker, Inc., N.Y., 91 (1988).

Primary Examiner—Fred Teskin
Attorney, Agent, or Firm—David W. Collins

[57] ABSTRACT

A precursor route to the synthesis of polyacetylene and other conductive polymers is provided by the formation of high energy polymers by ring opening metathesis polymerization. In particular, the high energy polymers having the following general formula are formed from monomers as shown:

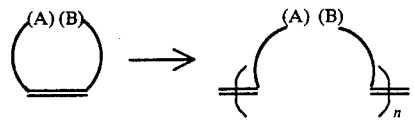

In the formula, A is an organic structure that is relieved of strain upon the ring opening polymerization and B is an organic structure with strain energy $\geq 20$ kcal/mole. Such high energy polymers are also found to be spontaneously decomposable with heat or mechanical stress. Consequently, the high energy polymers formed in accordance with the invention may find use in explosives or other sources of high energy.

18 Claims, No Drawings

HIGH ENERGY POLYMERS FORMED BY RING OPENING METATHESIS POLYMERIZATION

ORIGIN OF INVENTION

The U.S. Government has certain rights in this invention pursuant to Contract No. CHE-8520517 awarded by the National Science Foundation.

TECHNICAL FIELD

The present invention relates to high energy polymers, and, more particularly, to ring opening metathesis polymerization as a means of synthesizing such polymers and to the fabrication of polyacetylene from such high energy polymer.

BACKGROUND ART

High energy polymers are a class of materials of interest as explosives and propellants. In addition, some of these high energy polymers may be precursors to conductive polymers.

Conductive polymers currently represent an active area of research in polymer science. Polyacetylene (PA) has been at the center stage throughout the evolution of this field with a conductivity that can be increased with doping to values that rival copper. PA and many other conductive polymers are insoluble, infusible materials with low tensile strength, and thus manipulation of these materials into useful shapes and morphologies is limited.

One solution to these material and processing problems has been the use of soluble precursor polymers that can be transformed into conductive polymers. Precursor routes have afforded the synthesis of materials with higher molecular weights and highly ordered anisotropic morphologies.

One major drawback to the existing precursor routes is that they generally rely on the extrusion of molecular fragments. These extruded fragments may comprise a substantial fraction of the total mass, and thus potentially limit the usefulness of these processes. The development of precursor routes that do not rely on the extrusion of small molecules is therefore desirable.

DISCLOSURE OF INVENTION

In accordance with the invention, a precursor route to the synthesis of polyacetylene and other conductive polymers is provided by the formation of high energy polymers by ring opening metathesis polymerization (ROMP).

In particular, monomers having the general formula

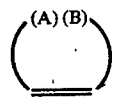

form high energy polymers by ROMP. The polymers have the general formula

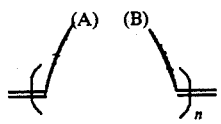

In the formula, A is an organic structure that is relieved of strain upon the ring opening polymerization and B is an organic structure with strain energy $\geq 20$ kcal/mole.

An example of such high energy polymers has been found to be spontaneously decomposable with heat or mechanical stress. Consequently, the high energy polymers formed in accordance with the invention may find use in explosives, propulsion, or other sources of high energy. Other polymers of the same general type may be useful as high energy materials.

The polyacetylene formed in accordance with the invention has very good mechanical properties. Oriented polyacetylene can be formed by stretching the high energy polymer prior to its isomerization into polyacetylene. Fibers may be drawn from concentrated solutions of polyacetylene precursors and thus provide a route to oriented polyacetylene wire.

BEST MODES FOR CARRYING OUT THE INVENTION

The description which follows below is directed to two specific examples. One example is a monomer, benzvalene (I), which is converted to a high energy polymer, polybenzvalene (II), by ring opening metathesis polymerization (ROMP). The high energy polymer may be converted to polyacetylene (III) by Lewis acidic catalysts or may be spontaneously decomposed by heat or mechanical stress. A second example, pentacyclo[6.2.1.0$^{2,7}$.0$^{3,5}$.0$^{4,6}$]undec-9-ene, (IV), contains a strained functionality which is incorporated into the corresponding polymer (V) after ROMP. Examples of other monomers are also provided, and it is expected that these will behave in a similar manner.

Polybenzvalene (II) may be synthesized by the ROMP of the highly reactive but readily available monomer benzvalene (I), as shown in Scheme 1. The ROMP of I has only been made possible by the development of non-Lewis acidic, well-defined active tungsten alkylidene metathesis catalysts.

Scheme 1

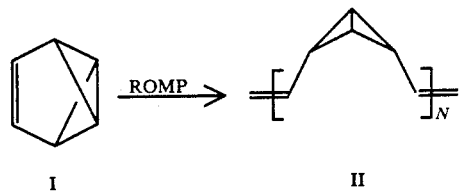

I          II

The reaction of I with titanocene alkylidenes resulted in metallocycles that were thermally unreactive at temperatures less than 80° C. At these temperatures, I is rapidly converted to benzene. In addition, I was found to react exothermically with Lewis acidic catalysts WCl$_6$:Sn(CH$_3$)$_4$, WOCl$_4$:Sn(CH$_3$)$_4$, and ((CH$_3$)$_3$CCH$_2$O)$_2$W(Br)$_2$CHC(CH$_3$)$_3$:GaBr$_3$ to give a dark brown intractable material.

II is an interesting material; the bicyclobutane moiety has approximately 64 kcal/mole of strain energy, and thus the polymer has about 11 kcal of strain energy per carbon atom (C). High energy polymers, which are defined herein as having a strain energy of at least 3 to 4 kcal/C, may have applications in propulsion technologies.

Differential scanning calorimetry (DSC) reveals the irreversible liberation of 59 kcal/mole (repeat unit) of energy from II upon heating from 50° to 420° C. As a result of this high strain energy, II is a sensitive material that has been observed to undergo spontaneous exothermic decomposition upon the application of severe mechanical stress or rapid heating.

The strain energy of II is directly measured from its heat of combustion. This measurement on samples one week old provides a heat of formation of 65 kcal/mole (repeat unit). Subtracting the heat of formation for unstrained polymer gives a strain energy of 51 kcal/mole (repeat unit). This value is lower than the theoretical value as a result of partial decomposition of the sample before the measurement could be made.

Concentrated solutions of II gel upon standing, and after precipitation or evaporation II cannot be redissolved. The tendency for II to cross-link and spontaneously decompose has made it necessary to handle it in solution. As a result of the instability of II, films were cast directly from the polymerization solution.

II has a limited shelf life and loses 25% of its strain energy over about two months at room temperature. Other derivatives of II are expected to be more stable.

Gel permeation chromatography revealed a very broad molecular weight distribution ranging from about 1,000 to 600,000, with the average molecular weight approximately 20,000 (relative to polystyrene standards).

Solutions containing 2 to 5% II were viscous. Solutions tend to gel in a matter of hours and could only be stored in frozen benzene.

Solution NMR spectra of II were obtained by subjecting reaction mixtures to repeated partial evaporation and addition of $C_6D_6$. NMR data for II obtained with the catalysts above are as follows: three approximately equal intensity $^{13}C$ signals at 133.0, 47.8, and 12.8 ppm, and three approximately equal intensity $^1H$ signals at 5.83, 3.28, 1.73 ppm ($C_6D_6$) These shifts are compared to those of I ($^{13}C$ 133.7, 48.3, 36.6 ppm and $^1H$ 5.95, 3.53, 1.84 ppm in $C_6H_6$) Multiple smaller peaks in the region of 40 to 20 ppm were observed and the intensity of some of these peaks increased relative to the major peaks with increasing time; thus these peaks could be attributed to crosslinking and cis to trans double bond isomerization.

UV-visible spectra of films of II displayed a maximum at 190 nm and a shoulder at 270 nm. Infrared spectra were complex; however, the presence of cis olefins is confirmed by the strong absorption at 750 $cm^{-1}$. The infrared data and the observation of only one olefinic carbon in the $^{13}C$ NMR suggests that II has nearly exclusively cis olefins.

Gels of II that have been washed with a non-solvent (e.g., acetone, methanol), give solids which display elastomeric properties. On several occasions, these samples could be stretched to more than 30 times their original length, although spontaneous decomposition often occurred before reaching these lengths. Preliminary experiments indicate that fibers may be drawn from concentrated solutions. Films of II are strong, transparent, and smooth when observed by scanning electron microscopy. The films are also amorphous, as evidenced by X-ray diffraction, which showed only a diffuse halo characteristic of amorphous materials.

II is a precursor of polyacetylene (III) via the isomerization of the bicyclobutane rings to 1,3-dienes (Scheme 2). This type of isomerization has been promoted in the prior art thermally, photochemically, and by transition metals in a variety of substituted bicyclobutane compounds.

Scheme 2

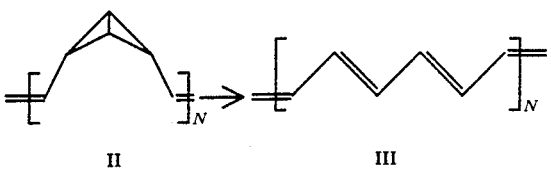

Thermal and photochemical isomerization of II were unsuccessful at producing high yields of PA. For example, irradiation with 193 nm laser light produced no observable change in the material. However, transition metal catalysts were successfully employed in the isomerization. In particular, solutions of $HgCl_2$, $HgBr_2$, or $Ag^+$ salts in tetrahydrofuran (THF) transformed films of II into shiny silvery materials resembling polyacetylene in appearance. Other suitable materials utilized in the isomerization reaction include $ZnCl_2$, $ZnBr_2$, and $ZnI_2$.

The conductivities of the resulting materials from $HgCl_2$, $HgBr_2$, and $Ag^+$ isomerization were $10^{-5}$, $10^{-7}$, and $10^{-8}$ $\Omega^{-1} cm^{-1}$, respectively, and were increased to I, $10^{-1}$, and $10^{-4}$ to $10^{-6}$ $\Omega^{-1} cm^{-1}$, respectively, upon $I_2$ doping. The conductivities were measured by the conventional DC four-probe method. Polybenzvalene films can be stretched and transformed into "oriented" polyacetylene. The conductivity of such oriented polyacetylene (500% elongation; $I_2$ doping) is about 50 $\Omega^{-1} cm^{-1}$.

The $HgCl_2$-isomerized material as produced was ductile and could not be ground fine enough to obtain the required spinning rates for NMR measurement. Trans-PA is known to be more brittle, and hence III was thermally isomerized to trans-III, which was readily ground. CP-MAS $^{13}C$ NMR spectra of the trans-III exhibited a sharp resonance at 135.5 ppm and a small broad signal at 40.0 ppm. Infrared spectroscopy revealed broad major absorptions at 3100, 1000 (trans), and 740 (cis) $cm^{-1}$. With thermal isomerization, the spectrum sharpened and the 740 $cm^{-1}$ resonance disappeared. The sharp 1329 $cm^{-1}$ absorption usually observed in cis-PA is not present in III. This is most likely a result of the broadness of the spectra and/or isolated cis-olefins. However, a slight decrease in the signal intensity of this region is observed with thermal isomerization to trans-III. Infrared spectra also displayed minor absorptions at 2800 and 1400 $cm^{-1}$, characteristic of saturated material before and after thermal treatment.

Characterization of the films obtained from the $HgCl_2$ isomerization (III) by solid state CP-MAS $^{13}C$ NMR and infrared spectroscopy indicated that polyacetylene (PA) had formed. Both spectroscopic methods reveal residual saturation. Integration of the CP-MAS $^{13}C$ NMR of III determined the degree of saturation to be approximately 10 to 19%. The saturation is apparently due to cross-linking, which may be promoted by residual $HgCl_2$ in the film, based on DSC scans of III, which showed no exothermic transitions indicating residual bicyclobutanes. Further, variations of parameters in CP-MAS $^{13}C$ NMR experiments indicated that the resonance at 40 ppm had a shorter $T_1$ than the 135 ppm peak, consistent with the 40 ppm peak having a more rigid environment.

The films of III have approximately a 40:60 cis:trans double bond content as determined by infrared spectroscopy. Since II was greater than 90% cis, it appears that the isomerization of the bicyclobutanes produces mainly trans olefins. Films of III are strong, flexible and of much lower crystallinity than polyacetylene prepared by other routes. X-ray diffraction experiments of III showed a somewhat broad peak at 23° (20Cu Kα) with no other observable peaks. The width at half height was 10°, which is considerably broader than PA prepared by prior art methods.

The results herein are best compared with the so-called "Durham PA" (J. H. Edwards et al, Polymer, Vol. 21, pp. 595-596 (1980)), which can also yield a material of low crystallinity. This amorphous morphology results in lower conjugation length and conductivity than the extensively studied, so-called "Shirakawa PA" (Chien, Polyacetylene; Chemistry, Physics, and Material Science, Academic Press (1984)).

The conductivities indicated hereinabove are comparable to unoriented Durham PA in spite of the above-mentioned cross-linking. Films of III have a conjugation length that is less than that of unoriented Durham polyacetylene, as evidenced by Raman and UV-vis spectroscopy. This lower conjugation length may be the result of the cross-linking and/or a more amorphous morphology in III. The amorphous morphology of III is also apparent in the fact that samples of this material swell noticeably with solvents.

The foregoing description has involved the specific example of the polymerization of benzvalene to polybenzvalene and the subsequent conversion of the polymer to polyacetylene. In general, high energy polymers may be formed by the ring opening polymerization of compounds having the general formula

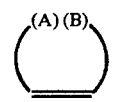

to form polymers having the general formula

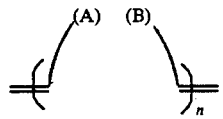

where A is an organic structure that is relieved of strain upon ring opening polymerization and B is an organic structure with strain energy $\geq 20$ kcal/mole.

Another specific example of such a monomer is pentacyclo[6.2.1.0$^{2,7}$.0$^{3,5}$.0$^{4,6}$]undec-9-ene (IV). It has been demonstrated that this readily synthesized monomer undergoes ROMP with non-Lewis acidic ROMP catalysts to form a polymer (V) containing a strained bicyclobutyl group. An irreversible release of 28 kcal/mole (repeat unit) is detected upon heating in a differential scanning calorimeter.

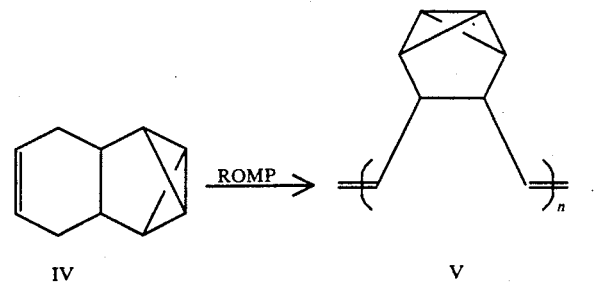

More examples of ring opening metathesis polymerizations include the following reactions:

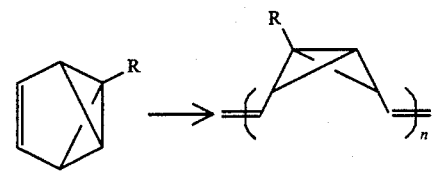

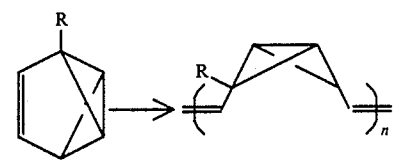

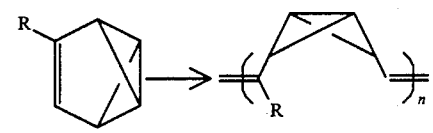

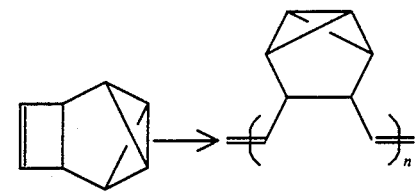

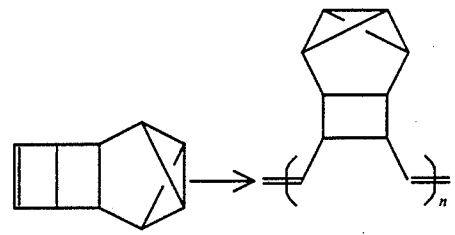

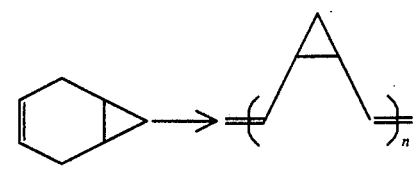

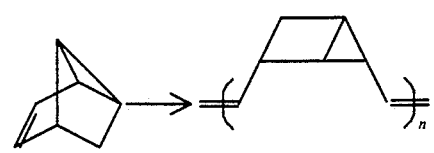

where R is an alkyl group (e.g., methtl, ethyl). Homopolymers and copolymers may be formed. Of the foregoing seven reactions, the first five polymers are potential polyacetylene precursors. All seven are high energy polymers.

EXAMPLES

General Procedures

All manipulations of air- and/or moisture-sensitive compounds were carried out using conventional Schlenck or vacuum line techniques. The flush gas (argon) was purified by passage through columns of activated BASF RS-11 (Chemalog ™ oxygen scavenger and Linde 4 Å molecular sieves. Solids manipulation and film casting were performed in a Vacuum Atmospheres glove box equipped with a MO-40-1 purification train charged with activated Ridox ™ oxygen scavenger and Linde 11 Å molecular sieves. All glassware was rinsed with base and dried in a 140° C. oven and subjected to vacuum while hot. $^1$H and $^{13}$C NMR were recorded on a JOEL FX-90Q spectrometer (89.6 MHz $^1$H; 23.53 MHz $^{13}$C). Differential scanning calorimetry was performed on a Perkin Elmer DSC-7 under a nitrogen purge. Infrared spectra were obtained on a Shimadzu IR-435 infrared spectrophotometer with a DR-1 data recorder. Gel permeation chromatography was obtained in $CH_2Cl_2$ at a flow rate of 1 ml/min, with an Altex 110A pump, Knauer differential refractometer, and Alltech TSK-Gel GMH6 (300 mm×7.5 mm) column. Molecular weights were referenced to polystyrene standards from Polysciences, Inc.. X-ray diffraction was measured with a home built Guinier camera in a vacuum with mono-chromatic Cu Ku radiation. Plots of the X-ray data for analysis were obtained by scanning developed film with a LKB Bromma Ultroscan XL laser densitometer.

Materials

The catalysts were prepared in accordance with prior art procedures; see, e.g., Schrock et al, J. Am. Chem. Soc., Vol. 110, pp. 1423-1435 (1988) and Schrock et al, Macromolecules, Vol. 20, pp. 1169-1172 (1987). The catalysts were purified by recrystallization from pentane (20° C. to −50° C.). I is explosive in pure form and must be handled in solution. Solutions of I were prepared by the published procedure (Katz et al, J. Am. Chem. Soc., Vol. 93, pp. 3783-3784 (1971) and Katz et al, Org. Syn., Vol. 53, pp. 157 (1973)), with the condition that the second equivalent of alkyl lithium was butyl lithium. By using a concentrated butyl lithium solution in hexanes, I could be obtained as a 1.0–1.5 molar solution in hexanes (other residual solvents were also present).

The concentration of I was determined by NMR integration against an internal standard of mesitylene. Solutions of I were degassed, placed under inert atmosphere, and stored over 4 Å molecular sieves at −50° C. The synthesis of I may result in residual dimethylether and diethylether in the solution of I which will decrease the activity of the catalysts and hence change reaction times. The polymerization procedure presented below is based on a concentration of diethylether of approximately 1 M with no residual dimethylether. $HgCl_2$ was dried under vacuum at 50° for 12 hrs and stored in a glove box. All non-halogenated solvents were vacuum distilled from sodium benzophenone ketyl and halogenated solvents were vacuum distilled from $P_2O_5$. The degassed solvents were stored under inert atmosphere. Both I and II are potentially dangerous materials and should be handled with caution.

General Synthesis of II

As a result of the tendency for II to undergo spontaneous exothermic decomposition, it is recommended that solid samples be limited to 1 g or less. Powders of II seem to be most prone to decomposition, and were observed to decompose when scraped away from the walls of glassware. Films should be gently cut with a razor blade, since tearing may also cause decomposition. Freshly prepared samples of II are most sensitive. However, samples that had been stored for 3 mo at room temperature have also been observed to spontaneously decompose with rapid heating. The polymerization of I is described below for the catalysists $(RO)_2W(N(2,6-diisopropylphenyl))CHC(CH_3)_3$, where R=t-butyl (VI) and R=hexafluoro-t-butyl (VII).

Films of II were cast directly from the reaction mixture onto glass slides. II may also be precipitated as a white or slightly yellowed powder by slow addition of the polymerization mixture to a ten-fold or greater volume of a non-solvent such as acetone or methanol. Polymerization yields in the procedures below were found to be greater than 70% by weighing precipitated powders. Precise yields of II were not obtained as a result of the sensitive nature of the m;aterial and the in situ procedures used.

Synthesis of II with VI

Catalyst VI is most conveniently used, since the reaction proceeds smoothly at room temperature. This procedure is best accomplished by conducting the reaction in a glove box. Polymerization conditions were 0.5 M in I, a 60:1 monomer to catalyst ratio, and a reaction time of 2.5 hrs. For example, 0.75 ml of a 1.5 M solution of I (1.13 mmole) was added to a 1.75 ml benzene solution of VI (10.7 mg, 0.019 mmole). After 2.5 hrs, the yellow homogeneous reaction mixture was viscous. At this time, the reaction mixture was cast directly into films on glass microscope slides in a glove box. Once dry, the smooth films were light yellow in appearance and soft and rubbery.

Synthesis of II with VII

The activity of the fluorinated catalyst (VII) is considerably greater than that of the non-fluorinated catalyst. Reaction of VII and I at room temperature results in a red solution and low yields of II, hence lower temperatures are required. A monomer concentration of 0.15 M was used (balance toluene) and a 50:1 monomer to catalyst ratio. The more dilute conditions are necessary to avoid the formation of insoluble polymer in the reaction. For example, 1.9 ml of a 1 M solution of I (1.9 mmole) was added to a 11 ml toluene solution of V (30 mg, 0.038 mmole) at −20° C. The reaction mixture was initially yellow in color. After 0.5 hr at −20° C., the reaction mixture was slowly allowed to warm to 0° C. over the course of 1.5 hr. The reaction mixture was light orange and the presence of polymer was apparent from the increased viscosity. The catalyst was deactivated by the addition of 10 equivalents of acetone (based on the number of moles of catalyst). The reaction mixture was concentrated in vacuo to approximately half the original volume and cast into light orange films in a glove box.

Conversion of I to III

A 5% solution of HgCl$_2$ was prepared in tetrahydrofuran. Freshly cast films of II on glass slides were immersed in this solution in a glove box at room temperature. The films turned red within seconds, to blue-green over the next thirty seconds, and finally to a black silvery shiny film within 2 to 3 minutes. Films were soaked in this solution for at least 1 hr and then removed from the glass slide. The resulting free-standing films of III were washed with THF, and further purified by Soxhlet extraction with THF.

Procedure for the Polymerization of Pentacyclo-[6.2.1.0$^{2,7}$.0$^{3,5}$.0$^{4,6}$]undec-9-ene Pentacyclo [6.2.1.0$^{2,7}$.0$^{3,5}$.0$^{4,6}$]undec-9-ene was prepared by the published procedure (Christl et al, Chem. Ber., Vol. 110, pp. 3745-3758 (1977)). The monomer was dissolved in benzene in a N$_2$ drybox. A benzene solution of (RO)$_2$W(N(2,6-diisopropylphenyl))CHC(CH$_3$)$_3$ (where R=hexafluoro-t-butyl) was then added and the yellow solution was allowed to stand at room temperature for ten minutes. The resulting polymer was precipitated from methanol and then collected by centrifuging the solid and decanting off the methanol. The solid was then dissolved in chloroform and reprecipitated from pentane. The collected solid was kept in vacuo overnight.

Differential scanning calorimetry revealed the irreversible liberation of 28 kcal/mole of energy upon heating the polymer from 50° C. to 380° C. Proton NMR peak positions were as follows: 5.8, 3.0, 2.5, 2.1, 1.8, and 1.6 ppm (C$_6$D$_6$) Carbon-13 NMR peaks were present at 132, 50, 41, 40, 34.3, 3.2, and 1.2 ppm (C$_6$D$_6$).

INDUSTRIAL APPLICABILITY

The synthetic route herein may be used in the production of polyacetylene. Alternatively, the intermediate high energy polymer formed may find application in propulsion technologies or other explosive technologies.

Thus, a new precursor route to polyacetylene is provided that does not involve the extrusion of molecular fragments. This method may also be used to form highly ordered polyacetylene. Further, this precursor method may be generally used in the syntheses of other conductive polymers, and other precursors may be employed in the method. Various changes and modifications of an obvious nature will be readily apparent to those of ordinary skill in the art, and all such changes and modifications are considered to fall within the scope of the invention, as defined by the appended claims.

What is claimed is:

1. A process for forming a high energy polymer comprising subjecting monomer to a ring opening metathesis polymerization in the presence of a non-Lewis acidic tungsten alkylidene metathesis catalyst to form said high energy polymer, wherein said monomer and said polymer are selected from the group consisting of

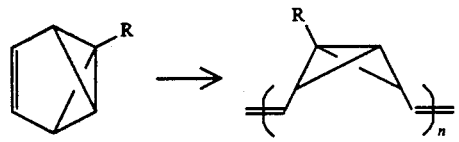

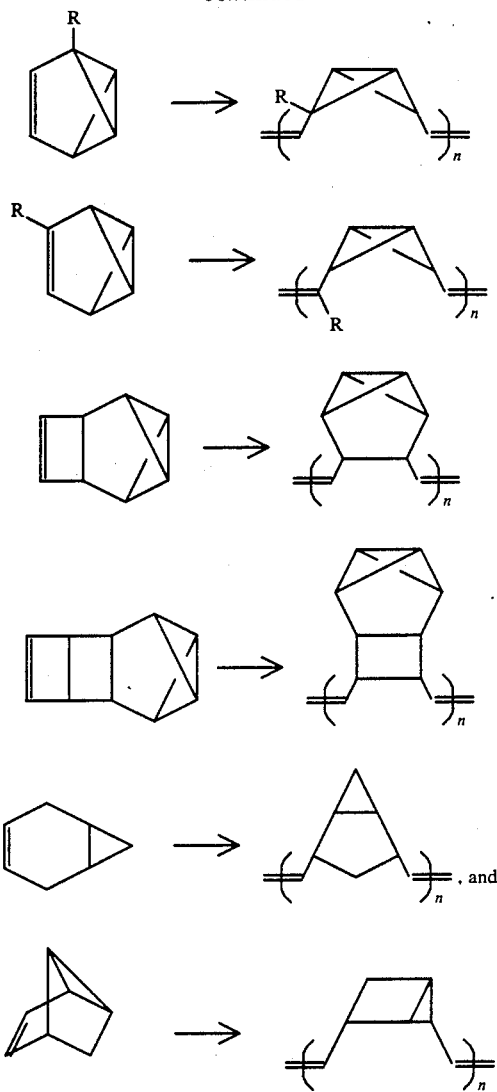

where R is an alkyl and n ranges from about 8 to 7,700.

2. The process of claim 1 wherein said catalyst has the formula (RO)$_2$W(N(2,6-diisopropylphenyl))CHC(CH$_3$)$_3$, wherein R=t-butyl or hexafluoro-t-butyl.

3. Product produced by the process of claim 1.

4. A process for forming polybenzvalene comprising subjecting benzvalene to a ring opening metathesis polymerization in the presence of a non-Lewis acidic tungsten alkylidene metathesis catalyst to form and polybenzvalene.

5. The process of claim 4 wherein said catalyst has the formula (RO)$_2$W(N(2,6-diisopropylphenyl))CHC(CH$_3$)$_3$, where R=t-butyl or hexafluoro-t-butyl.

6. Product produced by the process of claim 4.

7. A process for forming polypentacyclo-[6.1.1.0$^{2,7}$0$^{3,5}$,0$^{4,6}$]undec-9-ene comprising subjecting pentacyclo[6.1.1.0$^{2,7}$0$^{3,5}$,0$^{4,6}$]undec-9-ene to a ring opening metathesis polymerization in the presence of a non-Lewis acidic tungsten alkylidene metathesis catalyst to form said polypentacycle-[6.1.1.0$^{2,7}$0$^{3,5}$,0$^{4,6}$]undec-9-ene.

8. The process of claim 7 wherein said catalyst has the formula (RO)$_2$W(N(2,6-diisopropylphenyl))CHC(CH$_3$)$_3$, where R=t-butyl or hexafluoro-t-butyl.

9. Product produced by the process of claim 7.

10. A process for forming polyacetylene comprising:
   (a) subjecting a monomer to a ring opening metathesis polymerization in the presence of a non-Lewis acidic tungsten alkylidene metathesis catalyst to form a high energy polymer, wherein said monomer and said polymer are selected from the group consisting of

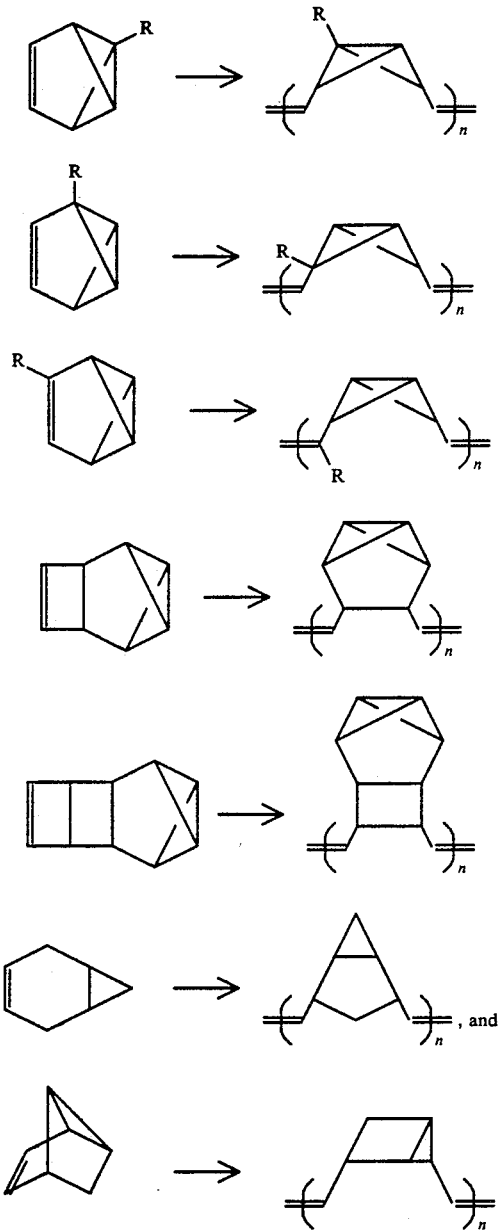

where R is an alkyl and n ranges from about 8 to 7,700; and
   (b) converting said high energy polymer to said polyacetylene in the presence of a catalyst.

11. The process of claim 10 wherein said metathesis catalyst has the formula (RO)$_2$W(N(2,6-diisopropylphenyl))CHC)CH$_3$)$_3$, where R=t-butyl or hexafluoro-t-butyl.

12. The process of claim 10 wherein said high energy polymer is isomerized to form said polyacetylene in the presence of a catalyst selected from the group consisting of HgCl$_2$, HgBr$_2$, Ag$^+$ salts, ZnCl$_2$, ZnBr$_2$, ZnI$_2$.

13. A process for forming polyacetylene comprising:
   (a) subjecting a benzvalene to a ring opening metathesis polymerization in the presence of a non-Lewis acidic tungsten alkylidene metathesis catalyst to form polybenzvale; and
   (b) converting said polybenzvalene to said polyacetylene in the presence of a catalyst.

14. The process of claim 13 wherein said metathesis catalyst has the formula (RO)$_2$W(N(2,6-diisopropylphenyl))CHC(CH$_3$)$_3$, where R=t-butyl or hexafluoro-t-butyl.

15. The process of claim 13 wherein said polybenzvalene is isomerized to form said polyacetylene in the presence of a catalyst selected from the group consisting of HgCl$_2$, HgBr$_2$, Ag$^+$ salts, ZnCl$_2$, ZnBr$_2$, and ZnI$_2$.

16. High energy polymers formed by ring opening metathesuis polymerization of monomers having at least one strained ring, said polymers and monomers having the formulae selected from the group consisting of

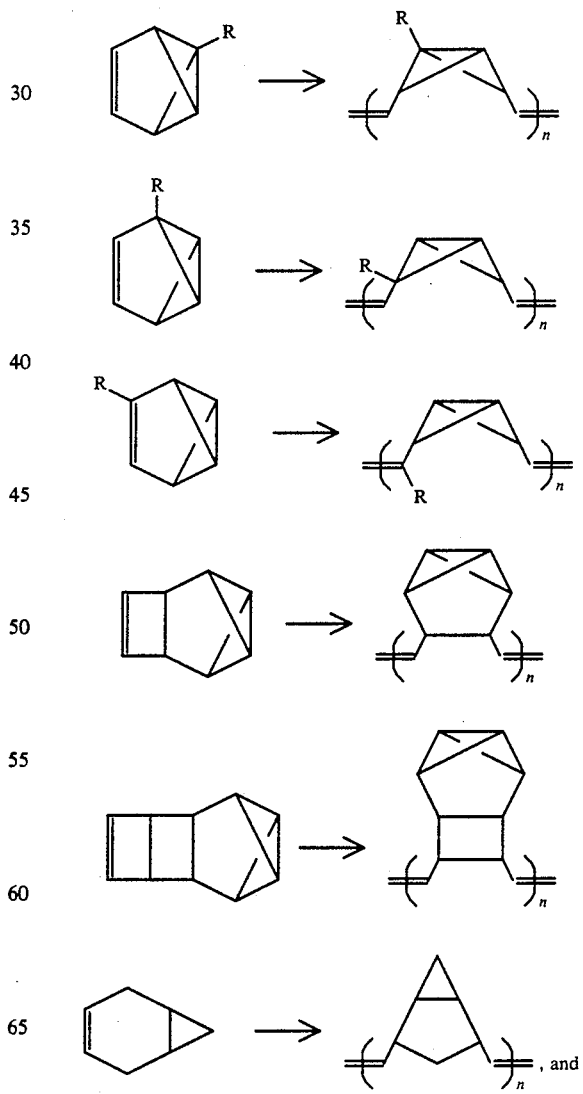

-continued

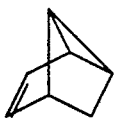  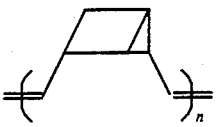

where R is an alkyl group and n ranges from about 8 to 7,700.

17. Polymerized benzvalene and derivatives having the benzvalene structure, the polymer having the general formula given by

where N ranges from about 8 to 7,700.

18. Polymerized pentacyclo[6.1.1.0$^{2,7}$0$^{3,5}$.0$^{4,6}$]undec-9-ene and derivatives having the pentacyclo[6.1.1.0$^{2,7}$0$^{3,5}$.0$^{4,6}$]undec-9-ene structure, the polymer having the general formula given by

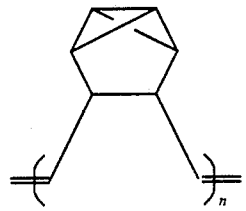

where n ranges from about 8 to 7,700.

* * * * *